INVENTORS
L. D. Soubier and
J. R. Hoge
BY Rule & Hoge
ATTORNEYS.

Patented Aug. 20, 1940

2,212,483

UNITED STATES PATENT OFFICE 2,212,483

MOLD CHARGING DEVICE

Leonard D. Soubier and John Ralph Hoge, Toledo, Ohio, assignors to Owens-Illinois Glass Company, a corporation of Ohio Application March 13, 1937, Serial No. 130,660
Renewed January 4, 1940

18 Claims. (Cl. 18—30)

This invention relates to improvements in apparatus for molding and curing resinous materials and relates more particularly to means for transferring measured charges of moldable resinous material from a source of supply to the molding and curing apparatus.

The automatic feeding of charges of resinous material is not entirely new, inasmuch as it is common practice to move a material containing hopper over a stationary mold plate to thereby simultaneously charge a plurality of mold cavities formed in said plate with quantities of moldable material, thereby using the mold cavity itself as a measuring device and thereafter sliding the hopper from its charging position to an idle position with a scraping contact between the upper surface of the mold plate and the lower face of the hopper to level off the mold charges. Ordinarily, there is no relative motion between the molds and the hopper other than the charging stroke of the hopper, that is, rotary, oscillatory or translatory movement to present mold cavities in succession to a charging position for charging.

Therefore, it is considered new in the art to provide a mechanism that will segregate a measured quantity of moldable material from a supply body, transfer it to a position removed from said supply body, and then discharge it into the cavity or cavities of a moving or relatively movable mold.

In the present invention there are numerous objects contemplated and among these is first, to provide an automatic mechanism for transferring in succession measured charges of material from a container to a series of relatively movable mold cavities.

Another object is the provision of novel means for feeding in succession suitable charges of moldable material to molds of different capacities.

A further object is the alternate feeding of large and small quantities of moldable material and insuring the proper quantity being charged into each mold cavity.

A still further object is the feeding of like measured quantities of moldable material to the plural cavities of a single mold or series of molds.

A further object is the provision of means whereby the quantity of material fed to each mold cavity may be accurately regulated.

Another object is the provision of means whereby various sizes and shapes of articles may be manufactured on the machine at the same time.

Other objects will appear hereinafter.

Mechanisms for molding and curing resinous materials as illustrated in the accompanying drawings are, with the exception of the material charging device, identical with those shown and described in our Patent #2,202,797 dated May 28, 1940, and therefore only a brief descriptive résumé of these mechanisms shall be given in order to provide a proper basis for the actuation of the charging device, which, of course, is the main object of this present invention.

Although the above mentioned co-pending application shows a charging device of a construction somewhat similar to that of the present application, it would not be possible with the particular mechanisms shown in the co-pending case to obtain automatically and in succession charges of molding material that differ or vary as to quantity. Accordingly the present mechanism is of a character that allows regulation and presentation in succession, mold charges of varied quantity and at the same time allows the simultaneous manufacture of articles of various sizes and shapes on the same head and same machine.

The apparatus contemplated in accordance with the teachings of this invention may be varied in a number of different ways but for the purpose of illustration and description, a specific apparatus will be herewith disclosed.

The mechanism in general consists of a series of molding or curing heads arranged in a straight line and enclosed in an oven or chamber which is heated through the medium of electrical heating elements individual to the molding heads and controllable individually as to temperature.

Each head consists of a table or carrier supporting two or more molds, which table is arranged within the heated oven for intermittent indexing to bring its molds successively to charging, charge preheating and final forming and curing positions. These heads also have individual thereto forming mandrels and hydraulic cylinders which incidentally are common to the molds on each head and arranged in vertical alignment with each other in order that each mold on the table may be brought in alternation to a position for cooperation therewith and then placed under pressure for the final curing of the moldable material.

The indexing of the mold tables is synchronized with operating mechanism for feeding the molding material to the molds as well as operation of the pressing mechanism.

In the feeding of charges to the molds, a hopper or container for a quantity of the moldable material is employed and arranged for travel back and forth along the front of the molding oven or chamber. The movement of this hopper in one direction not only indexes the mold tables to present empty molds to the charging positions periodically, but also causes measured charges of the material to be placed in the cavities of the molds of each table in succession, while the movement in the opposite direction is merely an idle stroke so far as charging of the molds is concerned and provides a means of obtaining a curing interval in the molding cycle as will be hereinafter explained. This hopper device also carries mechanism which allows adjustment of the time of mold charging relative to mold indexing.

The mechanism which reciprocates the hopper is connected to two cam shafts, one for controlling the hydraulic pressing cylinders and one which controls the application of air or fluid to the mandrel for cooling and to the mold for cleaning. This first mentioned cam shaft has mechanism thereon which allows the proper sequential timing of the several operations of each molding head, as well as the sequence of operation of the heads relative to each other. Likewise, the second cam shaft allows the proper sequential timing of the application of air or fluid to each molding mandrel and mold.

The removal of the molded articles from the machine is an operation that can be definitely set with respect to the stripping of the mold from the formed article and, therefore, does not require adjustment. The article removal is accomplished by means of a rotating disk which is actuated by the withdrawal of the pressing plunger from the mold at the pressing position.

The machine herein disclosed consists primarily of a framework or base 20, superimposed upon which is a head casting 21 forming an elongated oven or chamber for a series of forming or curing heads, each of which is provided with one or more molds 22.

At one end of the frame 20 is mounted a bracket 23 for supporting a hydraulic driving power unit 24, said unit being of the ordinary commercial type and in turn driven by an electric motor 25. This unit 24 is of the variable speed type in order that any desired driving speed may be obtained.

Attached to the power unit drive shaft is a horizontal drive shaft 30 which is continuously rotated and has formed in its periphery and throughout its length, right and left spiral screw threads or slots 31 and 32, respectively, these slots being interconnected at each end of the shaft 30 by a semi-circular slot 19. The rotation of the shaft 30 supplies, through slots 31 and 32, means for moving a material container or hopper 33 to and fro along the front of the machine, as well as supplying the actuating power for other operations of the machine.

At one end of the shaft 30, which is supported in brackets or extensions 34 of the head casting 21, is a sprocket 35 connected to another sprocket 36 on a cam shaft 37 by a chain drive 38, forming thereby a drive for the movable parts of the machine, and providing means through which the series of molding heads and their actuating mechanisms may be caused to function in proper sequence.

Charging mechanism

The charging mechanism consists of a hopper or material hopper 33 of a size sufficient to carry at least enough material to insure filling a complete set of molds for a predetermined period of time of operation. This hopper is mounted upon a slide 40, which is carried in horizontal slideways 41 formed on one side of the head casting 21. Formed in this slide 40 beneath the hopper 33 and extending at right angles to the slide 40, is a slideway 42 which supports the charge transferring members 43 and 43a and serves to guide said members between a charging position beneath the hopper 33 to a discharging position over a forming mold 22.

The slide 40 has a depending bracket 44 which is slidably adjustable in slideways 39 on the slide 40 by means of a screw 45, for the purpose of changing the position of the members 43 and 43a lengthwise of the slide 40 to advance or retard the time of arrival of the charging members 43 and 43a at the charging position. Thus, we can change the time of presentation of the charge or charges to the molds, especially in relation to their indexing. This adjustment allows control of the time interval of retention of the charges in the molds 22 in advance of the actual forming operation and thereby controls the preheating period of the moldable material.

For ease of assembling and disassembling, the bracket 44 may be formed in two parts 44ª and 47 clamped around bushings 46 which ride on the shaft 30. These bushings have lug extensions 48 (Fig. 3) which project into the spiral threads 31 and 32, thus causing the slide 40, through rotation of shaft 30, to move to and fro across the front of the machine and present the charging device in succession to the various molding heads. The spiral threads 31 and 32 are connected at each end by the semi-circular groove 19 to allow the changing of direction of movement of slide 40, said groove 19 being so designed that the slide has but a slight pause during the changing of its direction of movement. This is conventional structure.

In order to control the charging members 43 and 43ª in their charging strokes, cam racks 50 and 50ª have been provided, said racks being mounted on the front portion of the head casting 21. The cam rack 50 which controls the charging member 43 is secured to the head casting 21, while the cam rack 50ª which controls the charging member 43ª is mounted above the cam rack 50 by means of U-shaped brackets 51, these brackets being attached to the head casting 21 and spaced at intervals throughout the length of the machine. The cam racks 50 and 50ª have a series of depressions 52 and 53 respectively arranged therein and located at predetermined positions horizontally relative to the mold to which either may be assigned. A pair of horizontal levers 54 and 54ª are fulcrumed on a pivot pin 55 in an extension 56 of the slide 40 and are connected to the charging members 43 and 43ª by means of links 60 and 61. The lever 54 carries a cam roller 62 so positioned as to ride in contact with the outer surface of the cam rack 50 while the lever 54ª carries a roller 63 positioned to ride on the control surface of cam racks 50ª. A spring 64 is individual to each lever and holds each roller in contact with its controlling cam rack 50 and 50ª respectively.

Inasmuch as the slide 40 is connected to the continuously rotating drive shaft 30, it must, therefore, move continuously in either direction, and as it moves to the right in Figs. 2, 4, 5 and 6, the cam rollers 62 and 63 will drop into their respective depressions 52 and 53, projecting the charging members 43 and 43ª in succession or in unison through openings 65 in the front of the head casting 21. The projection of these members automatically opens the doors 66, allowing the entry of the charging members. These doors are normally held in closed position by means of springs 67. The projection of the members 43 and 43ª carries a charge or charges of molding material from the hopper to the molds 22 located within the oven or head casting 21.

As the slide 40 continues to the right on its charging motion, the cam roller 62 will be caused to travel up the incline 69 of the cam rack 50, thus retracting the charging members from the charging position in the oven to a position beneath the material hopper 33, where they again receive a fresh charge of molding material in the cavities 68 and 68ª. It will be noted that the cam rack 50 alone controls the retraction of the charging members, due to the fact that a lug extension 80 of the lever 54 picks up lever 54ª, moves it outwardly and retains it until cam rack 50ª picks up the roller 63. Thus it will be seen that the charging stroke is independently controlled by the separate cam racks 50 and 50ª, but the retraction is common to cam rack 50. It will be noted that the members 43 and 43ª control the flow of material from the hopper 33, i. e., the material can only flow when the cavities 68 and 68ª are in alignment with the hopper outlet.

Figures 9, 10, 11, 12, 16:
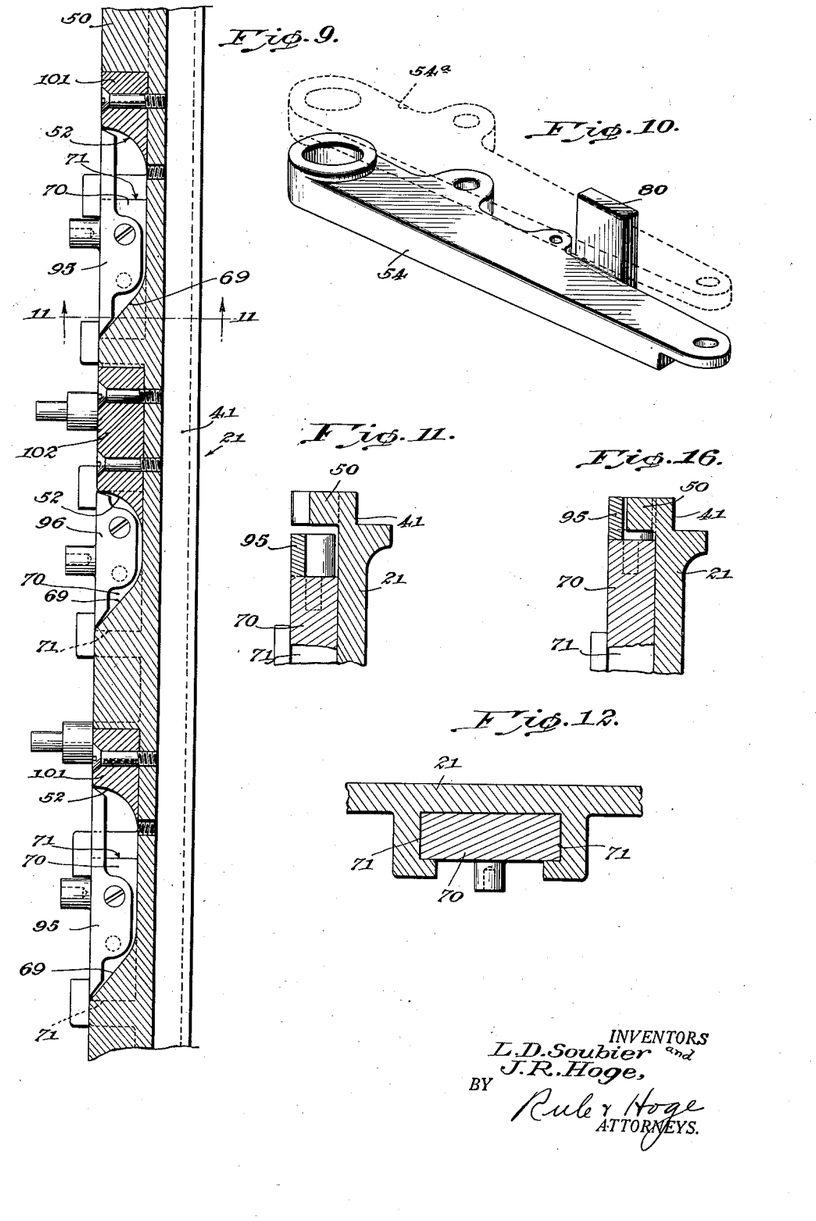
Fig. 9 is a sectional plan view taken approximately at line 9—9 on Fig. 1, showing the cam mechanisms for controlling the charging device in its operative and inoperative positions.
Fig. 10 is a detailed view of one of the charging mechanism control levers.
Fig. 11 is a detailed view in sectional elevation taken at line 11—11 on Fig. 9, of one of the automatic cam members in retracted position.
Fig. 12 is a cross-sectional plan view taken at the line 12—12 on Fig. 2, showing the slide construction for the control cams of the charging device.
Fig. 16 is a part sectional elevation taken at line 11—11 on Fig. 9, showing the cam control block in raised position.

Due to the fact that the material container 33 delivers charges of material while moving in one direction and is idle when moving in the opposite direction, it is necessary that provision be made for definitely controlling these operations. This has been accomplished by providing a series of cam blocks 70 arranged for vertical sliding motion in slideways 71 and controlled in their motion by the movement of the hopper 33 and the slide 40. As there is a series of these slides all having the same motion and operating simultaneously, it will be necessary to describe only one. A bell crank 72 pivoted at 73 on the front face of casting 21 is loosely connected to the cam block 70 by means of a pin 74, while the other end of the bell crank is loosely attached to a horizontal rod 75 by a loose connection pin 76. The rod 75 is mounted for horizontal reciprocation in bearing blocks 77, said rod having at opposite ends thereof L-projections 78 and 79 arranged to project through openings 82 and 83 in the casting 21 and positioned in the path of the sliding member 47 which forms a part of the main hopper slide 40. Thus, when the hopper 33 moves to the left in Figs. 2 and 3, the member 47 at the end of its stroke will contact the rod 78, moving it to the left and through the bell cranks 72 cause the cam blocks 70 to move downwardly to the position shown in Fig. 11. This movement of these cam blocks leaves the depressions 52 and 53 of the cam rack 50 open so that on the movement of the hopper 33 to the right on its charging stroke, the cam roller 62 will drop into the depression 52, thus projecting the slide member 43 to charging position. Likewise, the cam roller 63 will enter the depressions 53 to project the slide member 43ª to charging position. When the hopper reaches the end of its charging stroke, the member 47 will contact the L-projection 79 of the rod 75, which extends through the opening 83 of casting 21, thus shifting the bell cranks 72 about their fulcrums 73, moving the cam blocks 70 upward, closing the gaps or depressions 52, and providing a continuity of straight cam face and prohibiting the projection of the lower charging members 43 during the return motion of the hopper. In order to prevent the upper portion of the charging member 43ª from projecting to the charging position on the return or idle stroke of the hopper 43, a lug 80 is provided on the lever 54, said lug projecting upwardly into the horizontal path of the lever 54ª. Thus, when the lower lever 54 is prevented from moving inwardly either on a charging stroke, or on a return stroke, it will be impossible for the upper lever 54ª to move inwardly. From this it will be seen that the cam blocks 70 provide a means for locking both members of the charging device in an inoperative position.

In order that the cam blocks 70 may be retained in either operative or inoperative position after actuation by the rod 75, a lever 85 is mounted on a bracket 86 attached to the front face of the head casting 21, said lever being fulcrumed as at 88 having a loose pin connection 87 with the rod 75. From the pin 87 to a pin 90 in a projection of the bracket 86 there is suspended a spring 92, this spring being under tension so that the rod 75 in either position is held by this spring tension in that position, thereby insuring retention of the blocks 70 in either the operative or inoperative position.

Referring to Figs. 7, 9, 11, and 12, it will be noted that the cam blocks 70 have removably attached to their upper ends small hardened steel blocks 95 and 96, these blocks being designed to fit in whatever depression 52 is desired or formed at these points of control for the feeding mechanism. It will be noted that the cam rack 50 has definite cut-out portions or depressions 52 along its length into which are inserted removable blocks 101 and 102, these blocks being of different lengths for the purpose of controlling the point or points at which the cam roll 62 will move inward to thereby cause the charging members 43 to move into a charging position above molds 22. It will be noted on Fig. 9, particularly, that the block portions 101 and 102 could be interchanged as to their positions, thus moving the small depression to the point of the large depression or both may be made either large or small to control the deposit of either a single or double charge at either or both points.

Figures 2, 3:
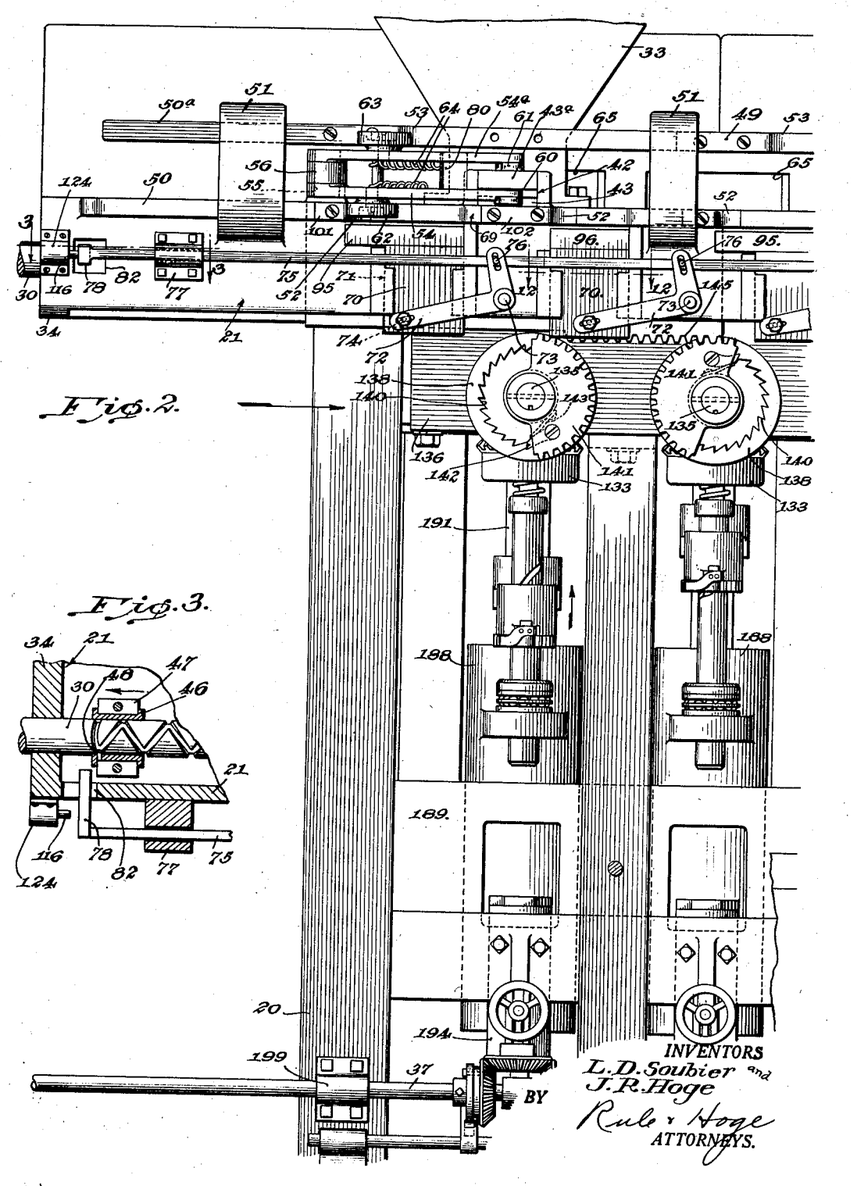
Fig. 2 is a front elevational view of one end of the machine showing two heads of the machine and feed mechanism control cams therefor.
Fig. 3 is a sectional plan view taken at line 3—3 on Fig. 2 of a portion of the mechanism for moving the charging mechanism control cam sections into operative position.
Figure 4:
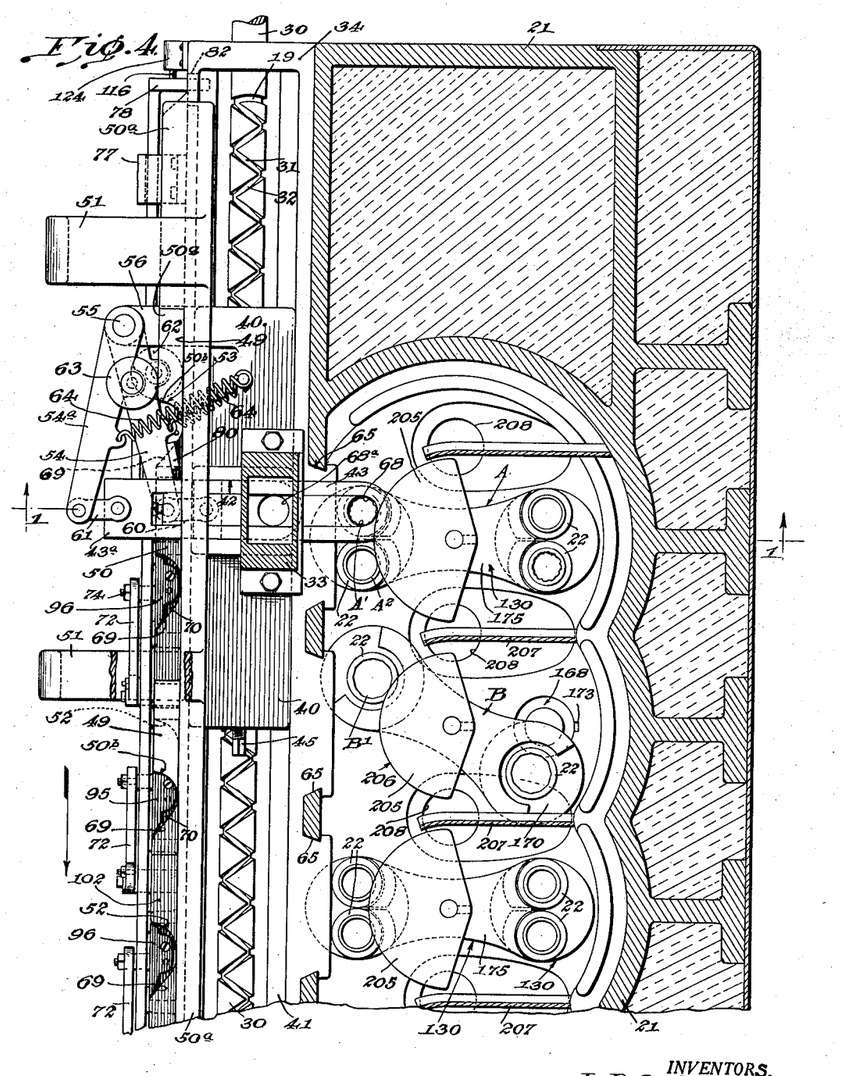
Fig. 4 is a sectional plan view taken at the line 4—4 on Fig. 1, showing the relation of mold heads, the single and multiple cavitied molds, and with the charging mechanism in charging position with relation to a multiple mold.

Referring to Figs. 2 and 4 it will be noted that the cam rack 50a has removable blocks 49 along its face, arranged at predetermined points thereon to control the charging stroke of member 43a, so that as the roll 63 reaches the depression 50b (Fig. 4) the charging member 43a is projected into the oven and over mold 22 to drop its charge of material. From the foregoing, it is apparent that any desired type of operation along the length of the cam racks 50 and 50a may be obtained by interchanging the cam blocks 49, 95, 96, 101 and 102.

As heretofore mentioned, the movement of the hopper 33 and charging members 43 and 43a to the left is always an idle stroke, there being no deposit of molding material into the molds during this movement, but during this time the material previously deposited in the molds is either preheating or under pressure for final molding.

The length of time required for the charging mechanism to make this return stroke necessarily controls to a great extent the time cycle of the curing of the molding material. Therefore, in order to have exact control over this portion of the cycle, the hydraulic speed control mechanism 24 is provided with a mechanism for automatically varying the speed setting of this control member. This mechanism consists of solenoids 105 and 105a, the cores 106 and 106a of which are attached by links 107 and 107a to a lever 108 pivoted on a horizontal shaft 109. This shaft 109 is mounted in a bracket 110 which forms a part of the housing 24. Mounted on the end of the shaft 109 is a sector gear 111. This sector gear is in mesh with a pinion 112 loosely mounted on the control shaft 113 of the speed changing device 24.

In order to provide a means for selecting the proper speed ranges, a lever 118 is secured to the shaft 113 and the pinion 112 is loosely mounted on said shaft but attached thereto by a spring pin 119, said pin being arranged to be inserted in any one of a series of holes 120 formed in the pinion 112. Thus, by removing the pin 119 from the holes 120, the shaft 113 may be rotated by a handwheel 122 to set the normal driving speed of the shaft 30 at any desired speed and in order to increase or decrease the speed, the solenoid actuated sector gear 111 is meshed at the desired points with pinion 112. Thus, it will be seen that under normal circumstances, the shaft 30 will rotate at any predetermined speed and as the switches 115 and 116 are actuated at the opposite ends of the charging device's travel, the speed of said shaft 30 will be increased or decreased as is desired, thus allowing further regulable control of the time cycle of the molding and curing units.

Figures 13, 14, 15:
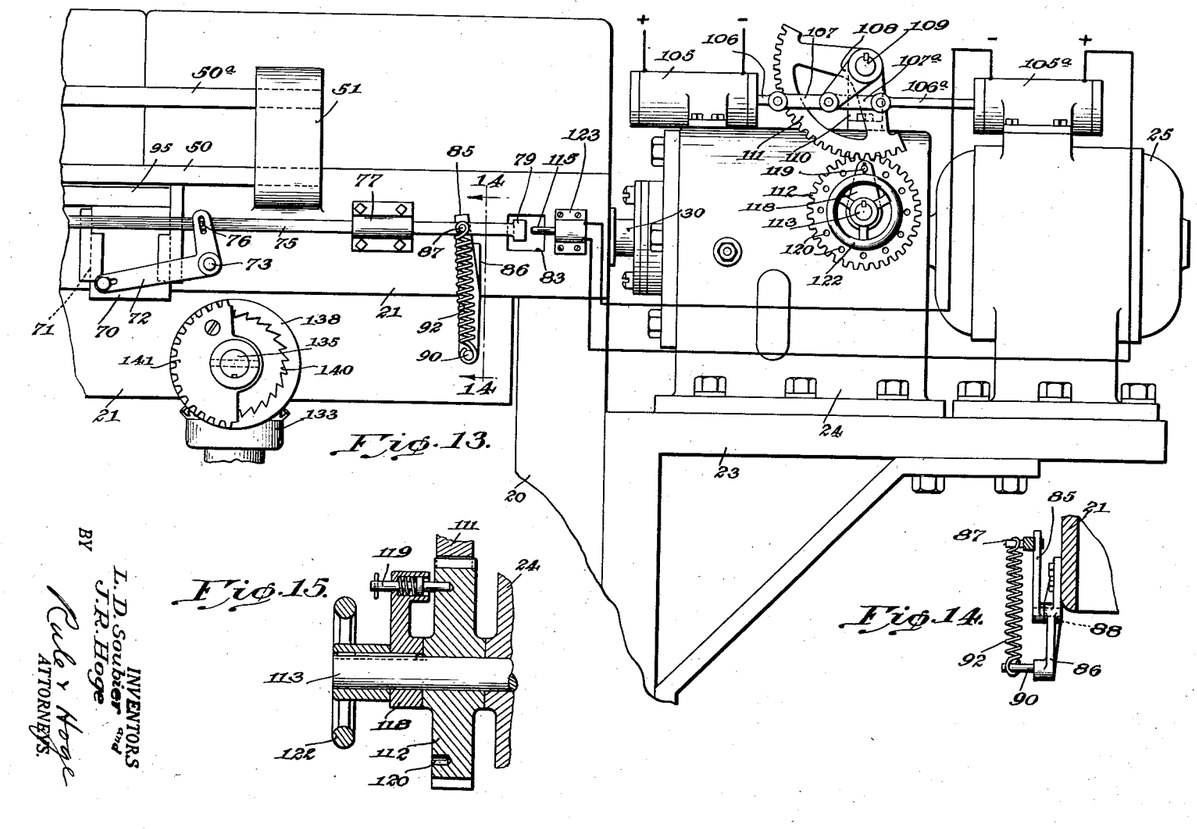
Fig. 13 is a view of the hydraulic speed control mechanism, illustrating the solenoid control for varying the speed of the main drive or control shaft to thereby vary the curing cycle of the machine.
Fig. 14 is a detail sectional view taken at line 14—14 on Fig. 13, of the mechanism for retaining the charging mechanism cam control blocks in either their operative or inoperative position.
Fig. 15 is a sectional elevational view through the speed changing mechanism of Fig. 13.

Referring to Fig. 13, it will be assumed that the parts in the position shown allow the shaft 30 to be driven at the proper speed for movement of the material hopper on its charging stroke and at the finish of this stroke it is desired to have the hopper returned to its original position at a much slower speed to provide a longer time interval for the curing of the moldable material. Thus, when the rod 75 is shifted to the right at the end of the charging movement of hopper 33, the projection 79 contacts a button 115 of an electrical spring switch 123 (see Figs. 5 and 13) energizing the solenoid 105a to thereby move the sector gear to the right, rotating the pinion 112 and shaft 113 in a direction that will slow down the speed of the drive shaft 30.

As the hopper returns on its slow motion and reaches the left-hand end of the machine, the shaft 75 will be actuated and moved to the left, causing the projection 78 to contact the button 116 of a second electrical spring switch 124 energizing the solenoid 105 and causing the sector gear to move back to the position shown in Fig. 13, thereby increasing the speed of the shaft 30 to that previously selected on the power control unit 24.

In order to reverse these conditions, i. e., cause the solenoid 105a to increase rather than decrease the speed of shaft 30 and the solenoid 105 to decrease in place of increasing the speed of shaft 30, then the wiring connection of each solenoid will be switched with each other.

*Molding mechanism*

The molding mechanisms in this machine are identical throughout the series of molding heads. Therefore, the description of the operation of this mechanism will in the main be confined to a single molding head.

Figure 1:
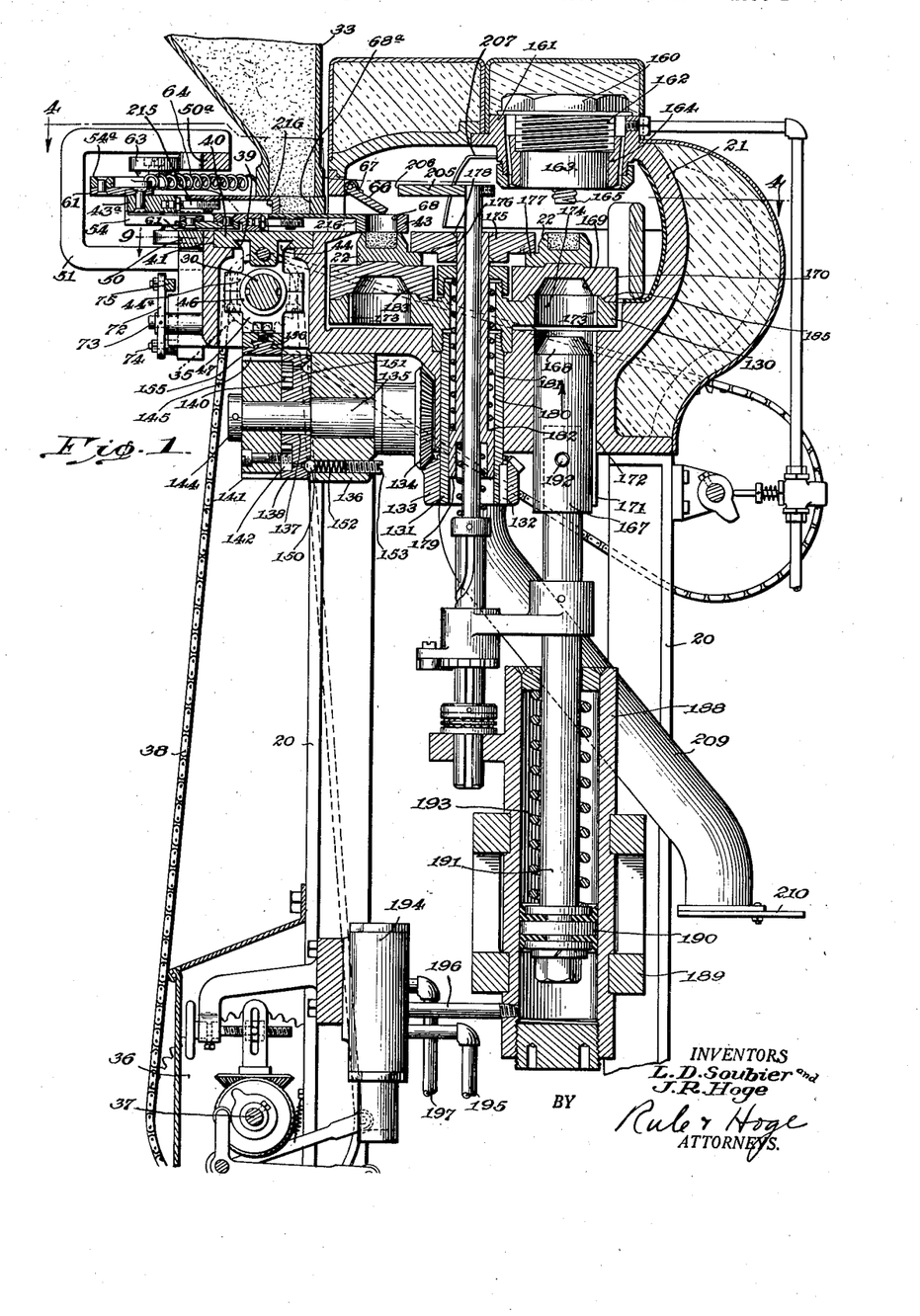
Fig. 1 is a sectional elevational view through one head of the machine taken at line 1—1 on Fig. 4, illustrating one position of the charging mechanism.

A molding head consisting of a table 130 mounted for rotation in the head casting 21 has attached centrally of the lower face thereof, a cylindrical bearing or shaft extension 131. Attached by a key 132 to the lower end of shaft extension 131 is a bevel pinion 133. Meshing with this pinion is a second bevel gear 134 mounted on and attached to a horizontal shaft 135 and supported in a bracket 136 attached to the lower side of the head casting 21. Permanently attached to the shaft 135 by means of a key 137 is a driving or indexing member 138, which is formed with internal indexing or ratchet teeth 140 on its inner periphery. Alongside of this driving member and freely mounted upon the shaft 135 is a positive drive sector gear 141 having a ratchet pawl 142 attached to its inner face, said pawl being held against the ratchet teeth 140 of member 138 by means of a flat spring 143. This sector gear 141 is held in position by means of a collar 144 pinned to the shaft 135. In order to drive these various gears, a rack 145, attached to the lower face of slide member 47 and forming a part of the feeding mechanism slide 40 is arranged to mesh with the sector gear 141 during the to and fro movement of the slide 40 along the front of the machine with the material hopper 33. Referring to Figs. 1 and 2, it will be noted that when the feeding mechanism or slide 40 is moving to the right, the rack 145 will engage the teeth of the sector gear 141, and rotate the gear clockwise, such rotation in turn causing the indexing member 138 to rotate clockwise due to the meshing of the pawl 142 with the ratchet teeth 140. This motion is transmitted through the bevel pinion 133 and gear 134, causing the mold table 130 to rotate 180° and thereby reverse the position of the molds, that is, cause movement of one mold from a charge receiving position to a combined charge forming and curing position, while the other mold moves from the charge forming and curing position to the charge receiving position.

When the motion of the slide 40 is reversed and it moves to the left (Figs. 1 and 2), the rack 145 meshes with the sector gear 141 and this gear will be rotated counter-clockwise and the ratchet pawl 142 will be ineffective. Thus, no motion will be imparted to the drive shaft 135 upon the reverse movement of the slide 40 and rack 145.

However, to insure that the drive shaft 135 is not moved from its previously indexed position (see Fig. 2), a locking detent 150 is utilized, said detent being projected into conical openings 151 in the member 138 by means of a spring 152 mounted in a bracket 136. An adjusting screw 153 provides means whereby tension through spring 152 to detent 150 may be regulated. In view of the fact that the indexing motion is limited to 180°, it is only necessary that two locking openings 151 be provided in the driving member 138. However, more than two molds may be utilized on each table 130 which would necessitate more openings 151 and the changing of rack 145 to a suitable size.

In order that the indexing of the tables may be properly coordinated, the rack 145 is formed with a dovetail tongue 155 mounted in a dovetail slot 156 formed in the lower portion 47 of the slide member 40. This construction allows the positioning of the rack 145 lengthwise of slide 40 in any desired manner, that is, it may be arranged to slightly precede the hopper 33 or succeed the hopper 33 as desired.

This adjustment, in combination with the adjustment previously described in connection with the charging mechanism, allows the obtaining of a cycle of operation of any desired character and the proper coordination of the charging mechanism and the indexing mechanism to thereby control the time interval of charging relative to indexing of the molds as well as the control of the time interval that the charge is being preheated in the mold.

After a mold 22 has been charged and indexed, it will then be in a position for cooperation with a forming mandrel 160, which is mounted in a boss 161 of the head casting 21. This mandrel is formed with screw threads 162 which allow it to be locked into the boss 161 and has a shank 163 extending through an opening 164 in said boss. Thus accurate vertical alignment of said mandrel relative to the mold 22 therebelow may be obtained. The lower end of the mandrel has a projection 165 which may be shaped to conform to any desired interior design of the article to be formed, but in this particular instance is formed with external screw threads which will cause the formation of internal screw threads on the article being produced.

When the mold table 130 indexes, bringing a mold 22 to the forming and curing position, it is accurately secured in this position by means of the locking member 150 of the indexing mechanism previously described, and in this position it is also in alignment with a pressure applying member 167. This member has a tapered conical-shaped end 168 arranged to fit into a correspondingly tapered cavity 169 formed in the mold adapter 170. The member 167 is provided with a key 171 which rides in a keyway 172 formed in the casting 21. When the table 130 comes to rest after being indexed, a keyway 173 formed therein is brought into alignment or registration with the keyway 172 formed in the casting 21, so that when the member 167 projects vertically upward through openings 174 in the table 130, the key 171 enters the keyway 173, locking the table 130 with the head 21 so that the mold 22 will be in exact registration with the mandrel 160 during the forming and curing operations.

In order to insure the seating of the mold 22 on the member 130, there is provided a holding member 175 having a downwardly facing portion 176, said member extending partially around the mold 22 and seating upon the shoulder 177 of the mold, thereby locking said mold between this member and the member 130. This holder 175 is welded as at 178 to a tubular shaft 179, which is mounted in an opening 180 formed in the table shaft extension 131.

A spring 181 rests on a shoulder 182 of the shaft 179 and is held in position by a screw cap 183 threaded upon the upper end of member 130. Thus, it will be seen that the pressure of the spring 181 is utilized to hold or retain the holder 175 under tension on the shoulder 177 of the mold 22 and thereby clamp the mold between this member 175 and the tapered point 168 of the pressing member 167 when the mold is being moved to and from the pressure forming position.

In this manner the mold is at all times retained in proper position both vertically and horizontally and this member 175 also insures that as the member 130 moves away from the pressure molding position to the position shown in Fig. 1, the mold will be stripped from the formed article and follow the member 130 vertically downward and seat upon the aligning boss 185 formed on the table 130. Moreover, this member 175 being under spring pressure retains the mold in position on the boss 185 during the time that the tables are indexed and prevents both horizontal and vertical motion of said molds.

In order to move the molds to and from molding and curing positions as illustrated in Fig. 1, vertically disposed hydraulic cylinders 188 have been provided, these cylinders being of the ordinary welded cylinder type and mounted in brackets 189 attached to the frame 20 of the machine. Each cylinder is provided with a piston 190 mounted on a piston rod 191, said piston rod being loosely attached to the member 167 by means of a pin 192. A spring 193 mounted in the cylinder 188 is utilized to cause a downward motion of the piston 190 after it has finished its pressure stroke during the forming operation.

In order to actuate these cylinders 188, a valve mechanism has been provided which consists of a valve 194 connected to a source of hydraulic pressure by a pipe 195 and having a connection 196 with the lower end of the cylinder 188 as well as an exhaust pipe 197 which conveys the previously used operating fluid back to a reservoir (not shown) of the ordinary type used in hydraulic operation. Referring to Fig. 1, it will be noted that the piston 190 is shown on its upward travel, that is, the valve 194 is in such position that the fluid under pressure has entered through the pipe 195 and passed through the valve 194 to pipe 196 into the cylinder, causing the piston to be moved to its upper position and held under pressure for a predetermined time, thus raising the mold 22 to the pressing position.

The shifting of the valve 194 to actuate the cylinders 188 in timed relation is cam controlled and will be described hereinafter. The retraction of the piston 190 is accomplished by shifting the valve 194 to bring the chambers of the valve into registration with pipes 196 and 197, thus allowing the fluid to return to the reservoir (not shown) through pipe 197. When this valve is shifted, releasing the pressure under the piston 190, a spring 193 becomes active and forces the piston downward, retracting the member 167 and through the action of spring 181 on the stripper yoke 175, the mold 22 is caused to descend and seat upon the projection 185 of the indexing table 130. The descent of the mold at this time causes it to strip itself from the formed resinous articles.

In order to control the cylinders 188 of the various heads on the machine, a cam shaft 37 mounted in brackets 199 attached to frame 20 has been provided. Mounted upon this cam shaft are series of pairs of cams, each pair being individual to a head, and controlling the actuation of the cylinders 188. This cam shaft 37 is driven by the shaft 30 through connecting chain 38, pinion 35 and sprocket gear 36, attached to shaft 37.

In order to remove this formed article, it is necessary to apply force in some shape or form to loosen it from said mandrel and, in this particular instance where a molded cap having an internal screw thread is being formed, this force is applied in the form of rotation through the medium of a disk 205 formed of asbestos or some similar material. This disk is so shaped that as it is rotated in the proper direction, its periphery 206 will contact the outer peripheral surface of the formed cap and cause it to be unscrewed from the mandrel 165. As this force is applied to rotate the cap in a counterclockwise manner, it will be apparent that as the cap unscrews and reaches the lower limit of the mandrel, it will be thrown sideways and, in order to guide this cap as it is thrown, a guard 207 is provided to the left of the center of each mold table. This guard prevents the cap from flying over into the adjacent molding heads and causes it to drop downwardly into a cone-shaped depression 208 from whence it drops through a pipe 209 to a control gate 210.

From the foregoing description, it should now be apparent that a definite charging and molding cycle prevails in this mechanism, and that more than one charge may be delivered to each head and, moreover, that the quantity of molding material delivered to each head may be varied.

Figure 5:
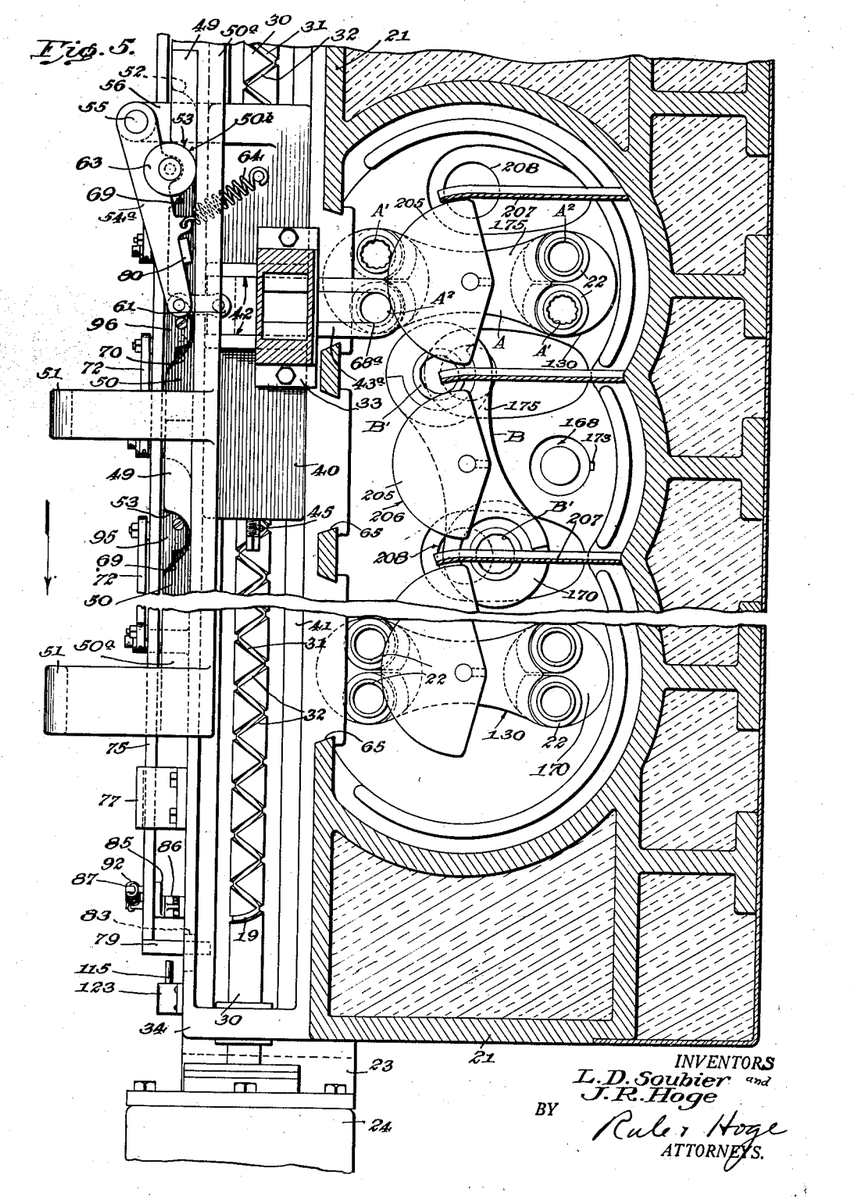
Fig. 5 is a sectional elevation view taken at line 4—4 on Fig. 1, showing the feeding or charging mechanism in another operating position with respect to a multiple cavitied mold.
Figure 6:
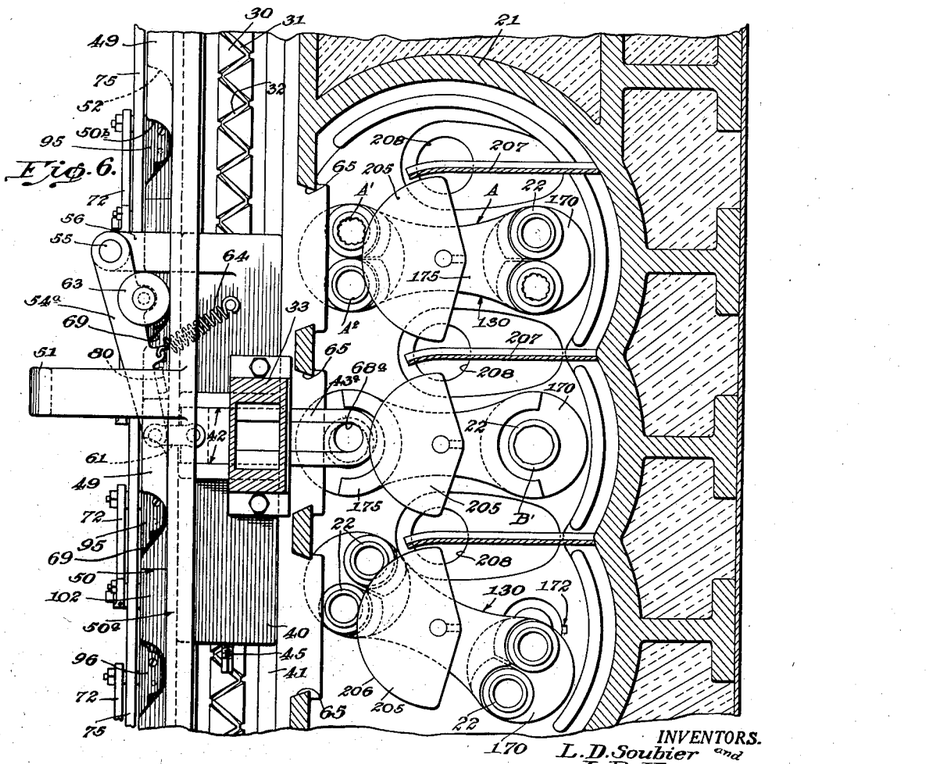
Fig. 6 is a part sectional elevation view taken approximately at line 4—4 on Fig. 1, showing the charging device in charging position with respect to a single cavitied mold.
Figure 7:
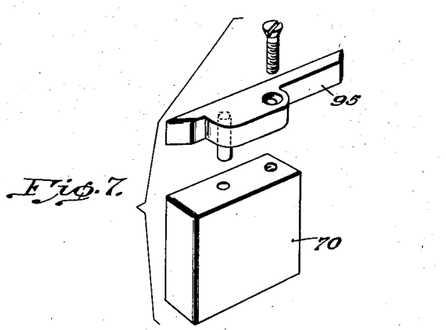
Fig. 7 is a detailed view of one of the automatic cam portions for retaining the charging mechanism in inoperative position with respect to the molds.
Figure 8:
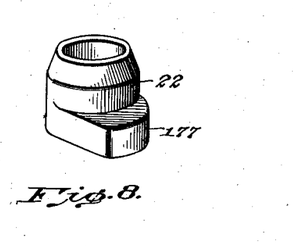
Fig. 8 is a detailed view of one manner in which a multiple cavitied mold may be constructed.

By referring to Figs. 4, 5 and 6, it will be noted that the table 130 designated as A carries a set of molds arranged in pairs on each side of the table and that the mold $A^1$ has a different shape than mold $A^2$. Also in these views, table B carries a single mold at its opposite ends, this mold having a cavity $B^1$ of considerable size and as a matter of fact a capacity equal to the combined capacities of molds $A^1$ and $A^2$. From this, it will be clear that different designs may be made simultaneously on this machine and varying sizes may also be produced simultaneously.

In order to control the quantity of moldable material in the charges supplied to the various mold cavities, there is provided an adjustment on the charging members 43 and $43^a$, which will vary the volume of the cavities 68 and $68^a$ respectively of these charging members. Toward this end, the feed members 43 and $43^a$ are formed in two parts which are adjustable relative to each other by means of adjusting screws 215 arranged between the members 43 and $43^a$ and their inner adjustable parts 216. This allows the capacity of the cavities 68 and $68^a$ to be varied and regulated to thus insure delivery of the proper quantity of material, or if pellets are being used it may be adjustable to fit the pellet or any multiple thereof.

Modifications may be resorted to within the spirit and scope of our invention.

We claim:

1. In an apparatus for molding articles from synthetic resins or like moldable materials by the application of heat and pressure, a stationary mold head including a mold provided with a single mold cavity, a second stationary mold head independent of said first mold head and including a mold provided with a plurality of adjacent mold cavities, a container for the moldable material, means for moving said container past said molds in succession, and means movable with the container for transferring a measured charge of said material from said container to the mold cavity of said first mold and for transferring a measured charge of said material from said container successively to each mold cavity of said second mold as said container passes said molds.

2. In an apparatus for molding articles from synthetic resins or like moldable materials by the application of heat and pressure, a mold provided with a plurality of mold cavities, a second and independent mold provided with a single mold cavity, a container for the moldable material, means for moving said container past said molds in succession, and means for transferring a measured quantity of material from said container successively to each mold cavity of said first mold and for transferring a plurality of measured quantities simultaneously to the mold cavity of the second mold as said container passes said molds.

3. In an apparatus for molding articles from synthetic resins or like moldable materials by the application of heat and pressure, a mold provided with a plurality of adjacent mold cavities, a second mold provided with a single mold cavity, the capacity of said single mold cavity being equal to the sum total of the capacities of said other mold cavities, a container for the moldable material, means for moving said container past said molds in succession, and means for transferring a measured quantity of said material from said container successively to each mold cavity of said first mold and for transferring a plurality of like measured quantities the number of which corresponds to the number of mold cavities provided in said first mold simultaneously to the mold cavity of said second mold as said container passes said molds.

4. An apparatus for molding articles from synthetic resin or like moldable materials by the application of heat and pressure comprising in combination a frame, a series of fixed molding heads supported thereon and arranged in straight line formation, each head including a mold, certain of said molds having a single mold cavity and others of said molds having plural mold cavities, means for repeatedly and continuously moving said container past said heads in succession, and means movable with the container for simultaneously transferring a plurality of measured quantities of said material to the mold cavity of each of said first specified molds and for transferring a single measured quantity to each mold cavity of said other molds successively as said container passes said heads.

5. An apparatus for molding articles from synthetic resins or like moldable materials by the application of heat and pressure comprising in combination a frame, a series of fixed molding heads supported thereon, each head including a mold, each mold having a mold cavity, a container for the moldable material, means for repeatedly and continuously moving said container past said heads in succession, and means movable with the container for successively and selectively segregating and transferring a measured quantity of said material to the cavity of the respective mold of each head, the volume of each quantity segregated being in proportion to the capacity of the respective cavity to which it is transferred.

6. An apparatus for molding articles from synthetic resins or like moldable materials by the application of heat and pressure comprising in combination a frame, a series of fixed molding heads supported thereon, each head including a mold, certain of said molds being provided with plural mold cavities and others of said molds being provided with a single mold cavity, a container for the moldable material, means for moving said container repeatedly and continuously past said heads, and means operable upon such movement of the container for transferring successively a single measured quantity of said material from said container to each mold cavity of said first specified molds and for transferring a number of like quantities simultaneously to each mold cavity of said other molds.

7. An apparatus for molding articles from synthetic resins or like moldable materials by the application of heat and pressure comprising in combination a frame, a series of fixed molding heads supported thereon in straight line formation, each head including a mold, a container for the moldable material, means for moving said container past said heads in succession, and means operable upon such movement of the container for selectively transferring from the container to said heads one or more like quantities of the moldable material for delivery to said molds.

8. In an apparatus for molding articles from synthetic resins or like materials, a mold provided with a pair of mold cavities, a container for the moldable material, a discharge outlet in the bottom of said container, means for moving said container past said mold, a material transfer device positioned beneath said container and movable therewith, said device including a pair of superimposed charge transferring members, each member being provided with a charge receiving cavity, said members being individually movable from a retracted position with the cavity thereof in register with said discharge outlet to receive a charge of the material to an extended position with the cavity thereof in register with one of said mold cavities to deliver its charge thereto, means for maintaining said members in their retracted positions prior to movement of said container past said mold, means operable during a portion of the movement of said container past said mold for moving the lowermost member to its extended position to deliver the charge contained in the cavity thereof to one of said mold cavities, and means operable during another portion of said movement for moving the uppermost member to its extended position to deliver the charge contained in the cavity thereof to the other mold cavity.

9. In a plastic molding machine, a mold provided with a pair of mold cavities, a container for moldable material, a discharge outlet in the bottom of said container, means for moving said container past said mold, a material transfer device positioned beneath said container and movable therewith, said device including a pair of superimposed charge transferring members, each member being provided with a charge receiving cavity, said members being individually movable from a retracted position with the cavities thereof in register with each other and with said discharge outlet to an extended position to transfer charges of the material from said container to the cavities of said mold, the cavities of said members being in register with each other when said members are both in their extended position, means for maintaining said members in their retracted positions prior to movement of said container past said mold, means operable during a portion of the movement of said container past said mold for moving the lowermost member to its extended position to deliver the charge contained in the cavity thereof to one of said mold cavities, and means operable during another portion of said movement for moving the uppermost member to its extended position to deliver the charge contained in the cavity thereof to the other mold cavity through the cavity in the lowermost member.

10. In an apparatus for molding articles from synthetic resins or like materials, a mold provided with a pair of mold cavities, a container for the moldable material, a discharge outlet in the bottom of said container, means for moving said container past said mold in a straight line path parallel to the line of said mold cavities, a material transfer device positioned beneath said container and movable therewith, said device including a pair of superimposed charge transferring members, each member being provided with a charge receiving cavity, said members being individually movable from a retracted position with the cavities thereof in register with each other and with said discharge outlet to an extended position with the respective cavities thereof overlying the line of said mold cavities, means for maintaining said members in their retracted positions prior to movement of said container past said mold, means operable during a portion of the movement of said container past said mold for moving the lowermost member to its extended position to deliver the charge contained in the cavity thereof to one of said mold cavities, and means operable during another portion of said movement for moving the uppermost member to its extended position to deliver the charge contained in the cavity thereof to the other mold cavity through the cavity in the lowermost member.

11. In an apparatus of the character described, a chamber having a side wall formed with a horizontal series of feed openings, molding devices positioned within the chamber in the vicinity of said feed openings, means for heating the chamber, a container for moldable material common to all of the molding devices, means for effecting relative movement between the chamber and container whereby the latter is brought into alignment with the feed openings one at a time, a charge transferring device adapted for projection through the feed openings to deliver charges of the moldable material from the container to the molding devices, means for actuating said device, and means for causing said transferring device to deliver a single charge to certain of said molding devices and to deliver a plurality of charges to others of said molding devices.

12. In an apparatus of the character described, a chamber having a side wall formed with a horizontal series of feed openings, molding devices positioned within the chamber in the vicinity of each feed opening, means for heating said chamber, a container for the moldable material, means for effecting relative movement between the chamber and container whereby the latter is brought into alignment with the feed openings one at a time, a discharge opening in the bottom of said container, a pair of sliding cutoff members positioned beneath said container and positioned one above the other, each member having a cavity formed therein, said members being movable to a position wherein said cavities are in register with each other and with said discharge opening, means operable upon movement of said container into alignment with certain of said feed openings for projecting one of said members, including the cavity thereof, through said feed openings to deliver a charge of said material to the respective molding devices thereof, and means operable upon movement of said container into alignment with others of said feed openings for projecting both of said members including the cavities thereof through said latter feed openings to deliver plural charges of said material to the respective molding devices thereof.

13. In an apparatus of the character described, a chamber having a side wall formed with a horizontal series of feed openings, molding devices positioned within the chamber in the vicinity of each feed opening, means for heating said chamber, a container for the moldable material, means for effecting relative movement between the chamber and container whereby the latter is brought into alignment with the feed openings one at a time, a discharge opening in the bottom of said container, a pair of sliding cutoff members positioned beneath said container and positioned one above the other, each member having a cavity formed therein, said members being movable to a position wherein said cavities are in register with each other and with said discharge opening, means operable upon movement of said container into alignment with certain of said feed openings for projecting said members, including the cavities thereof, successively through said feed openings to successively deliver charges of the material to the molding devices thereof, and means operable upon movement of said container into alignment with others of said feed openings for projecting both of said members, including the cavities thereof, simultaneously through said latter feed openings to deliver plural charges of said material to the respective molding devices thereof.

14. In an apparatus for molding articles from synthetic resins or like moldable materials by the application of heat and pressure, a frame, a series of aligned molding heads carried thereby, a heating chamber associated with each head, a mold disposed within each heating chamber, a container for the moldable material, means for moving said container from an initial position in one direction past said heads in succession, means for successively transferring measured charges of said material from said container to the respective mold of each head as said container passes said heads, means for moving said container in the other direction to return the same to its initial position, means for rendering said transferring means inoperative during the return movement of said container, and means for regulably varying the speed of movement of the container during the return movement thereof.

15. In an apparatus for molding articles from synthetic resins or like moldable materials by the application of heat and pressure, a frame, a series of aligned molding heads carried thereby, a heating chamber associated with each head, a mold disposed within each heating chamber, a container for the moldable material, means for moving said container from an initial position in one direction past said heads in succession, means for successively transferring measured charges of said material from said container to the respective mold of each head as said container passes said heads, means for moving said container in the other direction to return the same to its initial position, means for rendering said transferring means inoperative during the return movement of said container, and means automatically operable to increase the speed of movement of the container during the return movement thereof.

16. In an apparatus for molding articles from synthetic resins or like moldable materials by the application of heat and pressure, a frame, a series of aligned molding heads carried thereby, a heating chamber associated with each head, a mold disposed within each heating chamber, a container for the moldable material, means for moving said container throughout a charging stroke from an initial position in one direction past said heads in succession, means for successively transferring measured charges of said material from said container to the respective mold of each head as said container passes said heads, means for moving said container in the other direction to return the same to its initial position, means for rendering said transferring means inoperative during the return movement of said container, and means operable upon completion of the charging stroke of said container for increasing the speed of movement of the container during the return movement thereof.

17. In an apparatus for molding articles from synthetic resins or like moldable materials by the application of heat and pressure, a frame, a series of aligned molding heads carried thereby, a heating chamber associated with each head, a mold disposed within each heating chamber, a reciprocable container for the moldable material movable from an extreme position at one end of said series of heads through a charging stroke to an extreme position at the other end of said series and vice versa, driving means operable at a predetermined rate of speed for reciprocating the container, means for transferring measured charges of said material from said container to the respective molds of each head as said container passes said heads during the charging stroke thereof, means adapted to be engaged by said container at the completion of the charging stroke thereof for increasing the speed of said driving means, and means adapted to be engaged by said container at the completion of the return stroke thereof for restoring the normal speed of said driving means.

18. In an apparatus for delivering measured charges of granular moldable material to molds, a container for the materials having a discharge opening therein, a feeding device for transferring the material from the discharge opening to the molds including a pair of sliding cutoff members each having a cavity therein, said members being movable to a position wherein said cavities are in register with each other and with the discharge opening, means for effecting relative movement between the apparatus and the molds, and means actuated by such relative movement for selectively projecting the cutoff members to a position wherein the cavities thereof deliver charges of the material from the container to the molds.

LEONARD D. SOUBIER.
JOHN RALPH HOGE.